US008731174B1

United States Patent
Noble, Jr. et al.

(10) Patent No.: US 8,731,174 B1
(45) Date of Patent: *May 20, 2014

(54) EARLY SCHEDULED BREAK ALLOWANCE FOR CONTACT CENTER AGENTS

(71) Applicant: Noble Systems Corporation, Atlanta, GA (US)

(72) Inventors: James K. Noble, Jr., Marietta, GA (US); Jason P. Ouimette, Atlanta, GA (US)

(73) Assignee: Noble Systems Corporation

( * ) Notice: Subject to any disclaimer, the term of this patent is extended or adjusted under 35 U.S.C. 154(b) by 0 days.

This patent is subject to a terminal disclaimer.

(21) Appl. No.: 14/146,231

(22) Filed: Jan. 2, 2014

Related U.S. Application Data

(63) Continuation of application No. 13/841,376, filed on Mar. 15, 2013, now Pat. No. 8,644,489.

(51) Int. Cl.
*H04M 3/00* (2006.01)

(52) U.S. Cl.
USPC .............................. 379/265.01; 379/265.03

(58) Field of Classification Search
CPC .. H04M 3/5175; H04M 3/523; H04M 3/5183
USPC ........................................ 379/265.01–265.04
See application file for complete search history.

(56) References Cited

U.S. PATENT DOCUMENTS

| 5,499,291 | A | 3/1996 | Kepley |
| 2009/0164289 | A1 | 6/2009 | Minnich, Jr. et al. |
| 2013/0223610 | A1 | 8/2013 | Kohler et al. |

OTHER PUBLICATIONS

Noble Systems Corporation, ShiftTrack Agent Client Uer Manual Version 5.6, Nov. 2011, 17 Pages, Noble Systems Corporation, Atlanta, GA 30319.
Noble Systems Corporation, ShiftTrack Plus User Manual Version 5.6, Mar. 2012, 1350 Pages.
Three Steps for Attacking Adherence Problems, Reynolds, Penny, Contact Center Association, Jan. 24, 2012.

*Primary Examiner* — Rasha Al Aubaidi

(57) ABSTRACT

Various embodiments of the invention force a contact center agent to adhere to taking a scheduled break from handling communications for a contact center. In particular, a time corresponding to a start time for a scheduled break is detected and, upon detection, a current state is determined for the agent that indicates whether the agent is available to handle communications. In response to the state indicating the agent is available, the agent's state is automatically set without the agent's intervention to indicate the agent is unavailable to handle communications so that no communications are routed to the agent. At this point, the agent is to take his scheduled break. Accordingly, after a period of time, the agent's state is then automatically set to indicate the agent is available so that the agent's break is over and at least one communication is routed to the agent.

22 Claims, 9 Drawing Sheets

EARLY SCHEDULED BREAK ALLOWANCE FOR CONTACT CENTER AGENTS

CROSS REFERENCE TO RELATED APPLICATIONS

This application is a continuation of U.S. patent application Ser. No. 13/841,376, filed on Mar. 15, 2013, and entitled Forced Schedule Adherence for Contact Center Agents, the contents of which are incorporated by reference in their entirety.

BACKGROUND

Contact centers (also referred to as call centers) are used by various organizations to provide communication channels to the organizations' customers. For example, various organizations may utilize contact centers so that customers may contact the organizations with regard to issues customers may be having with the organizations' products and/or to place orders for the organizations' products. Typically, a contact center employs a number of agents that assist customers who have contacted or have been contacted by the contact center. These agents are scheduled to work during various times so that the contact center may provide adequate support to handle the volume of communications received and made by the contact center.

Thus, scheduling agents for a contact center is an important and complex process to ensure the contact center is operating at an acceptable efficiency with respect to handling the volume of communications received and made by the contact center at the lowest possible cost. To achieve optimal schedules, many contact centers make use of some type of scheduling system to assist in generating and maintaining schedules for their agents. In addition, scheduling systems may make use of forecasting techniques to better predict expected communication volumes. Accordingly, enormous effort goes into forecasting workloads (e.g., expected communication volumes), calculating staffing requirements to handle the workloads, and generating schedules to meet the staffing requirements.

Once an optimal schedule has been produced, the agents' adherence to the schedule is important so that acceptable efficiency, as predicated for the schedule, is achieved. Hence, a problem encountered by many contact center operators is that their agents do not adhere to schedules. For example, in many instances, agents in a contact center may frequently not take their breaks and/or lunch when they are scheduled so that these agents can join their friends during their friends' breaks and/or lunch. Such non-adherence leads to a loss in productivity as agents are not available at optimal times to handle the communication volume the contact center is expected to receive. Thus, a need in the industry exists to improve agents' adherence to schedules, especially with respect to scheduled times when the agents will not be available to handle communications (e.g., while an agent is on a break, at lunch, or at some other activity such as a meeting or training). It is with respect to these considerations and others that the disclosure herein is presented.

BRIEF SUMMARY

In general, embodiments of the present invention provide computer program products, methods, systems, apparatus, and computing entities for forcing a contact center agent to adhere to taking a scheduled break from handling one or more communications for a contact center. In various embodiments, a time corresponding to a start time for a scheduled break is detected and, upon detection, a current state is determined for the contact center agent. In these particular embodiments, the current state indicates whether the contact center agent is available to handle one or more communications for the contact center. For instance, depending on the embodiment, the communications may comprise one or more telephone calls and determining the current state for the contact center agent may involve determining whether the agent is currently handling a telephone call for the contact center or is available to handle a telephone call. While in other embodiments, the communications may comprises one or more series of text message exchanges between agents and parties external to the contact center and determining the current state for the agent may involve determining whether the agent is currently handling a series of text message exchanges or is available to handle a series of text message exchanges.

Thus, in various embodiments, in response to the current state indicating the contact center agent is available, the current state for the contact center agent is automatically set without intervention by the agent to indicate the contact center agent is unavailable to handle communications for the contact center so that no communications are routed to the contact center agent. At this point, the agent is to take his scheduled break. Accordingly, after a period of time, the current state for the contact center agent is then set to indicate the contact center agent is available to handle communications for the contact center so that the agent's break is over and at least one communication is routed to the agent. Thus, by monitoring when the agent's scheduled break is to occur and automatically setting the agent's current state without intervention by the agent to indicate the agent is unavailable to handle communications, the agent is forced to adhere to taking his break as scheduled. Likewise, after a period of time at which point the agent's break is to end and automatically setting the agent's current state to indicate the agent is available to handle communications, the agent is forced to adhere to ending his break as scheduled.

In particular embodiments, the process for forcing the agent to adhere to taking a scheduled break is carried out by the agent's workstation (e.g., a program module residing on the agent's workstation). While in other embodiments, the process is carried out by another component within the contact center such as, for example, a communication handling component, a workforce management component, or a combination of components. In addition, in particular embodiments, the period of time at which point the agent's current state is set back to indicate the agent is available to handle communications comprises an amount of time between the scheduled start time for the break and a scheduled end time for the break. While in other embodiments, the period of time comprises an amount of time between the scheduled start time for the break and a time at which the contact center agent requests to have the current state set to indicate the agent is available. In these particular embodiments, the amount of time comprises at least a threshold amount of a total amount of time between the scheduled start time and the scheduled end time.

Further, in particular embodiments, at the time the break is to occur, if the current state indicates the contact center agent is not currently available to handle communications because, for instance, the agent is already involved in handling a communication for the call center, then the process may involve waiting for the current state to indicate the contact center agent is available. At that point, the current state for the agent is then automatically set without intervention by the agent to indicate the contact center agent is unavailable to handle communications for the contact center so that no communications are routed to the agent and the agent can then take his break. Again, after a period of time, the current state for the agent is automatically set to indicate the contact center agent is available to handle communications for the contact center so that at least one communication is routed to the agent.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
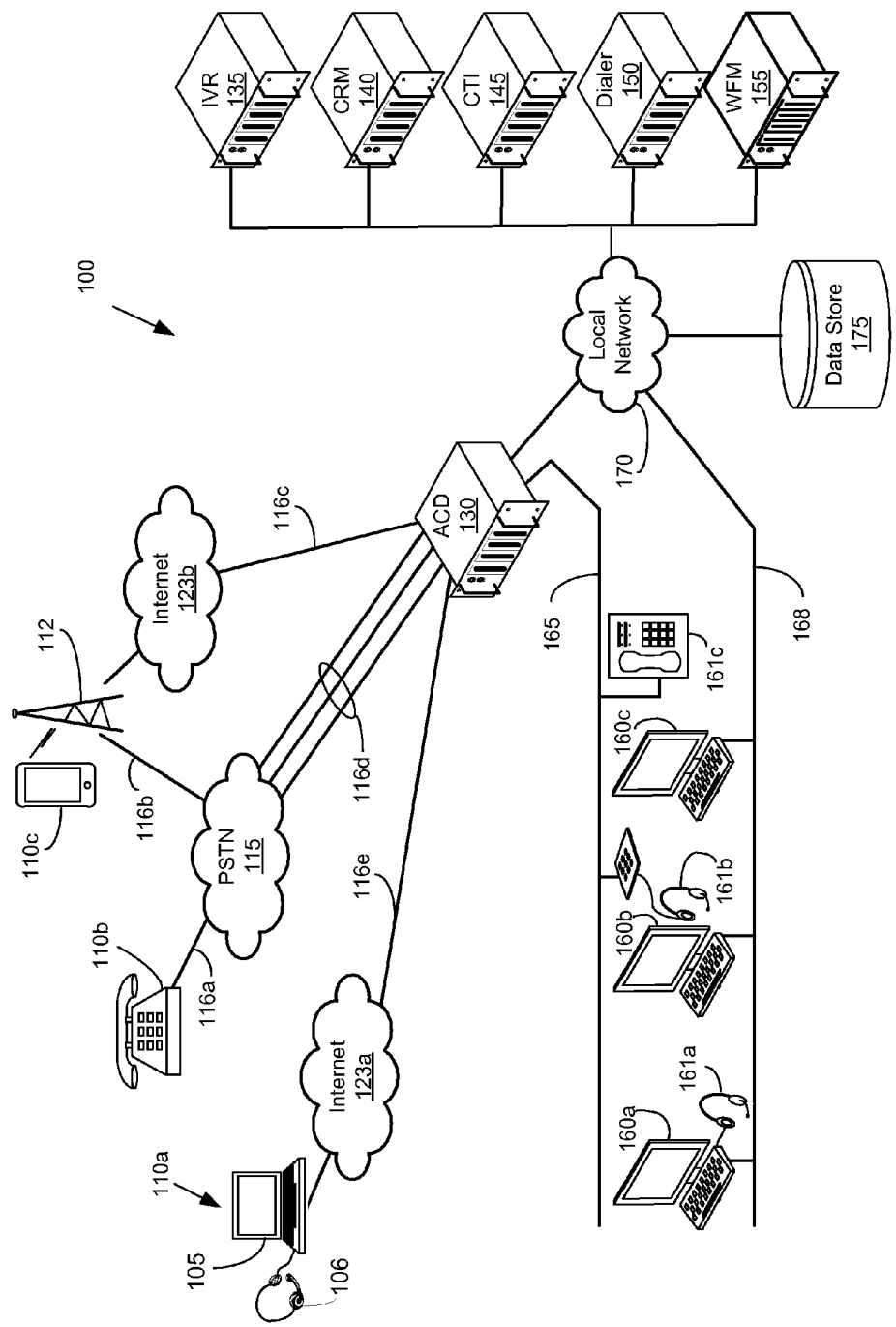
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. However, for the purposes of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110*a*, a conventional telephone 110*b*, a smart phone 110*c*, or other device known in the art. The term "call" as used herein may mean an active instance of two-way communication, an attempt to establish two-way communication, or a portion of the two-way communication. For example, a user at a conventional telephone 110*b* can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160*a*-160*c*, such as a computer, and a voice device 161*a*-161*c*. The combination of computing device 160*a*-160*c* and voice device 161*a*-161*c* may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position.

In particular embodiments, the voice device 161*a*-161*c* used by an agent may be a soft phone device exemplified by a headset 161*a* connected to the computer 160*a*. The soft phone device may be a virtual telephone implemented in part by an application program executing on the computer 160*a*. Further, the phone may also comprise an Internet Protocol ("IP") based headset 161*b* or a conventional phone 161*c*. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control, monitor, and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. In addition, in particular embodiments, the CTI server 145 may also monitor various components of the architecture 100. For example, the CTI server 145 may monitor the number of calls received and/or made by the call center and/or monitor performance parameters of agents such as the average handling time of calls for individual agents. Further, the CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160*a*-160*c* over facilities 168 along with routing the call to the agent's workstation phone 161*a*-161*c*. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response system (e.g., server) ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160a-160c to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123a, 123b for originating calls. After the calls are originated, a transfer operation by the ACD 130 (or dialer 150) may connect the call with an agent or a queue, or in some instances the IVR 135. In instances in which the call is placed in a queue, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another component that is employed in the call center architecture 100 shown in FIG. 1 is a workforce management system ("WFM") 155. In various embodiments, the WFM 155 maintains information and generates agents' schedules to effectively handle inbound/outbound communications. For instance, in particular embodiments, the WFM 155 maintains historical call volume information for call campaigns and generates forecasts for expected call volume based on the historical information to predict the number of agents needed to handle the call volume at a defined service level. The WFM 155 then applies the forecasts and information about available agents to generate work rosters of agents (e.g., schedules). That is, the WFM 155 schedules agents for work shifts according to the anticipated needs of the call campaigns.

Typically, an agent's work shift includes breaks that represent times during the shift in which the agent is not available to handle calls for the call center. For example, the agent's breaks may include a normal (e.g., scheduled) break from having to handle calls, a lunch break at which time the agent eats lunch, and/or other breaks that involve activities in which the agent is not available to handle calls. For instance, such breaks may include times during the shift in which the agent is at a meeting or is in training.

Although a number of the above components may be referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150, and WFM 155, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

Demonstration Example

An example is now provided that is used throughout this disclosure to demonstrate various aspects of embodiments of the invention. It is noted that this example is provided to help facilitate the reader's comprehension of these aspects of embodiments of the invention and should not be viewed as limiting the scope of the invention.

The example involves a call center that has produced a weekly schedule for several agents. In this instance, the schedule includes the times (e.g., shifts) in which each of the agents is scheduled to work. Within each agent's shift, the shift is broken down into segments of time during which the agent is expected to be available to handle calls received and/or made by the call center and segments of time during which the agent is expected to be unavailable to handle calls.

The segments of time during which the agent is expected to be unavailable to handle calls are referred to as "breaks." Because many of these breaks are expected, such breaks may be further referred as "scheduled breaks." Depending on the circumstances, a break may be categorized as a rest break in which the agent is expected to relax from handling calls. For instance, during a rest break the agent may go to the restroom, may have a cigarette or a coffee, and/or may check his personal email. In addition, a break may be categorized as a lunch break that is designated as a segment of time for eating. Further, a break may include other segments of time in which the agent is expected to be unavailable to handle calls for the call center. For instance, such a break may be categorized as a meeting break or training break. Finally, in certain circumstances, a break may be categorized as an unscheduled break. For instance, such a break may include an instance in which the agent takes an unexpected break because of an emergency such as the agent suddenly feels sick and needs to go to the bathroom. Those of ordinary skill in the art can envision other various segments of time that may be considered breaks in light of this disclosure.

Figure 2:
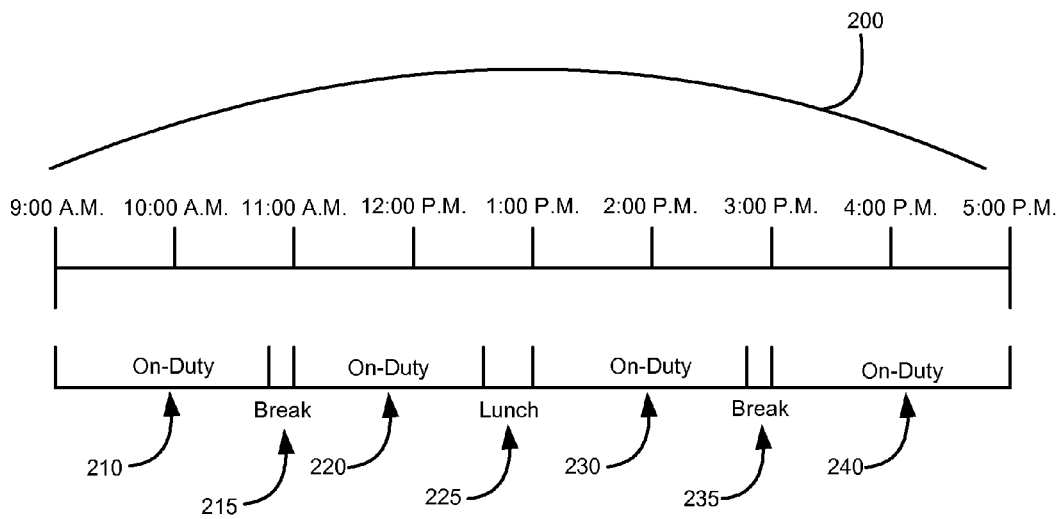
FIG. 2 is a daily shift schedule for a particular agent in accordance with various embodiments of the present invention.

Turning now to FIG. 2, an agent's daily shift schedule 200 for the call center is shown. The agent's shift 200 is scheduled from 9:00 A.M. to 5:00 P.M. and includes segments of time ("on duty") when the agent is scheduled (e.g., expected) to handle calls for the call center and segments of time when the agent is scheduled to be on a break and unavailable to handle calls. Specifically, the schedule 200 shows the agent is scheduled to be on-duty 210 to handle calls for the call center from 9:00 A.M. to 10:45 A.M. At this point, the agent is scheduled to take a fifteen minute break 215 at 10:45 A.M. At 11:00 A.M., the agent is scheduled to be back on-duty 220 until 12:30 P.M. At that point, the agent is scheduled for a thirty minute lunch break 225. After the agent's lunch break 225, the agent is scheduled to be back on-duty 230 from 1:00 P.M. until 2:45 P.M., at which point the agent is scheduled to take a fifteen minute break 235 until 3:00 P.M. Finally, the agent is scheduled to finish up the shift 200 by being on-duty 240 until 5:00 P.M. At that point, the agent's shift is completed. Therefore, in summary, the agent's shift 200 includes three different breaks: (1) a scheduled break 215 from 10:45 A.M. to 11:00 A.M.; (2) a lunch break 225 from 12:30 P.M. to 1:00 P.M.; and (3) a scheduled break 235 from 2:45 P.M. to 3:00 P.M.

Figure 3:
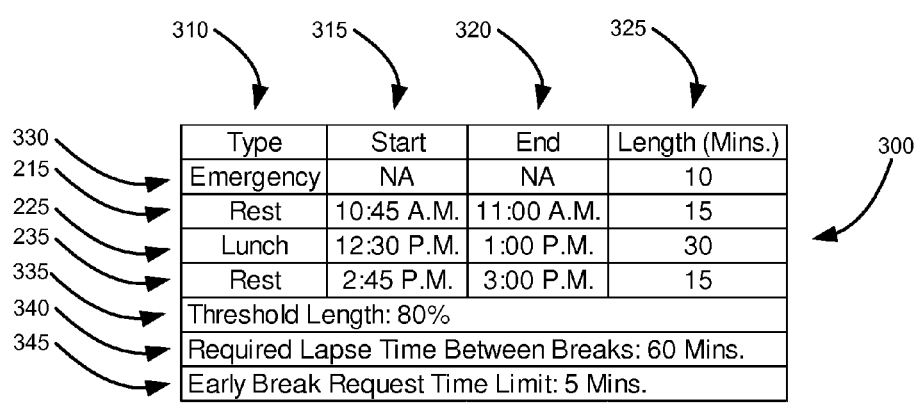
FIG. 3 is a summary table providing an agent's breaks information in accordance with various embodiments of the present invention.

FIG. 3 provides a summary table 300 of these three breaks along with additional information. In particular instances, this summary table 300 may be used as a basis for a data structure used by a computer processor to read and use the information conveyed in this table. The table 300 includes a column 310 identifying the type of break. For instance, the break 215 scheduled from 10:45 A.M. to 11:00 A.M. is listed as "Rest." This indicates the break 215 is a normally scheduled break in which the agent is expected to relax or rest from handling calls. Similarly, the break 225 scheduled from 12:30 P.M. to 1:00 P.M. is listed as "Lunch" indicating that this break 225 is provided to the agent so that he may eat lunch during this time. Finally, the break 235 scheduled from 2:45 P.M. to 3:00 P.M. is also listed as a "Rest" break. In addition, the table 300 also includes a column 315 indicating the start time for a break, a column 320 indicating the end time for the break, and a column 325 indicating the length of the break in minutes.

In this instance, the summary table 300 also includes an "Emergency" break 330 that has a length of ten minutes. As is discussed further below, an "Emergency" break 330 involves a non-scheduled break that the agent may take during the shift to address an "emergency" situation. For instance, if the agent is suddenly feeling sick and needs to immediately go to the bathroom, the agent may then request this "Emergency" break 330 so that he may go to the bathroom. This is the reason why this type of break does not normally include a scheduled start time and a scheduled end time. In this instance, one of these types of breaks has been provided to the agent during the shift 200 so that the agent may request a non-scheduled break if needed.

Finally, the table 300 includes additional information applicable to various embodiments of the invention, as is described in greater detail below. For instance, the table 300 includes a threshold length 335 of eighty percent. In particular embodiments, this threshold length 335 identifies the amount of a break the agent is required to take before the agent can request to be placed back into an on-duty state (e.g., available state). For example, if the agent is on his break 215 scheduled from 10:45 A.M. to 11:00 A.M., the agent may not request to be placed back into an on-duty state until at least twelve minutes (eighty percent of fifteen minutes) has passed since the agent started the break. Thus, in these particular embodiments, the threshold length 335 ensures that an agent takes at least a minimum amount of break time for any given break. It should be understood that in particular embodiments, different values for the threshold length 335 may be provided for different types of breaks. For instance, in one embodiment, a first threshold length 335 of eighty percent may be provided to apply to "Scheduled" breaks and a second threshold length 335 of fifty percent may be provided to apply to "Lunch" breaks.

Further, the additional information provided in the table 300 includes a required lapse time between breaks 340. This particular piece of information identifies the amount of time that must lapse after a break is completed before another break may be taken by the agent. In this instance, the required lapse time between breaks 340 is set to sixty minutes. Therefore, once the agent has completed the "Rest" break 215 from 10:45 A.M. to 11:00 A.M., the agent may not enter into another break until at least 12:00 P.M. Depending on the embodiment, the required lapse time between breaks 340 may or may not be applicable with respect to "Emergency" breaks 330. Thus, in these particular embodiments, the required lapse time between breaks 335 ensures that an agent allows for an appropriate amount of time to lapse in between breaks.

Finally, the additional information provided in the table 300 includes an early break request time limit 345. This particular piece of information identifies an amount of time an agent may request to take a break before the break is actually scheduled to start. Thus, in this particular instance, if the agent were to request to start his "Lunch" break 225 at 12:15 P.M. instead of 12:30 P.M., as scheduled, the agent would be denied the request because the earliest the agent may request to start his "Lunch" break 225 is 12:25 P.M. This is because, in this instance, the early break request time limit 345 is set to five minutes. In various embodiments, setting a value for the early break request time limit 345 helps to ensure that an agent is adhering to the scheduled times for his breaks. It should be understood that in particular embodiments, similar to the threshold length 335, different values for the early break request time limit 345 may be provided for different types of breaks.

The information conveyed in the schedule 200 shown in FIG. 2 and the summary table 300 shown in FIG. 3 for a particular call center agent will now be used to demonstrate different aspects of the claimed invention. Again, it is noted that the information provided in these two figures is but one example of such information that may be used in accordance with various embodiments of the invention and this information should not be construed to limit the scope of the claimed invention.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Monitoring Module

Figure 4:
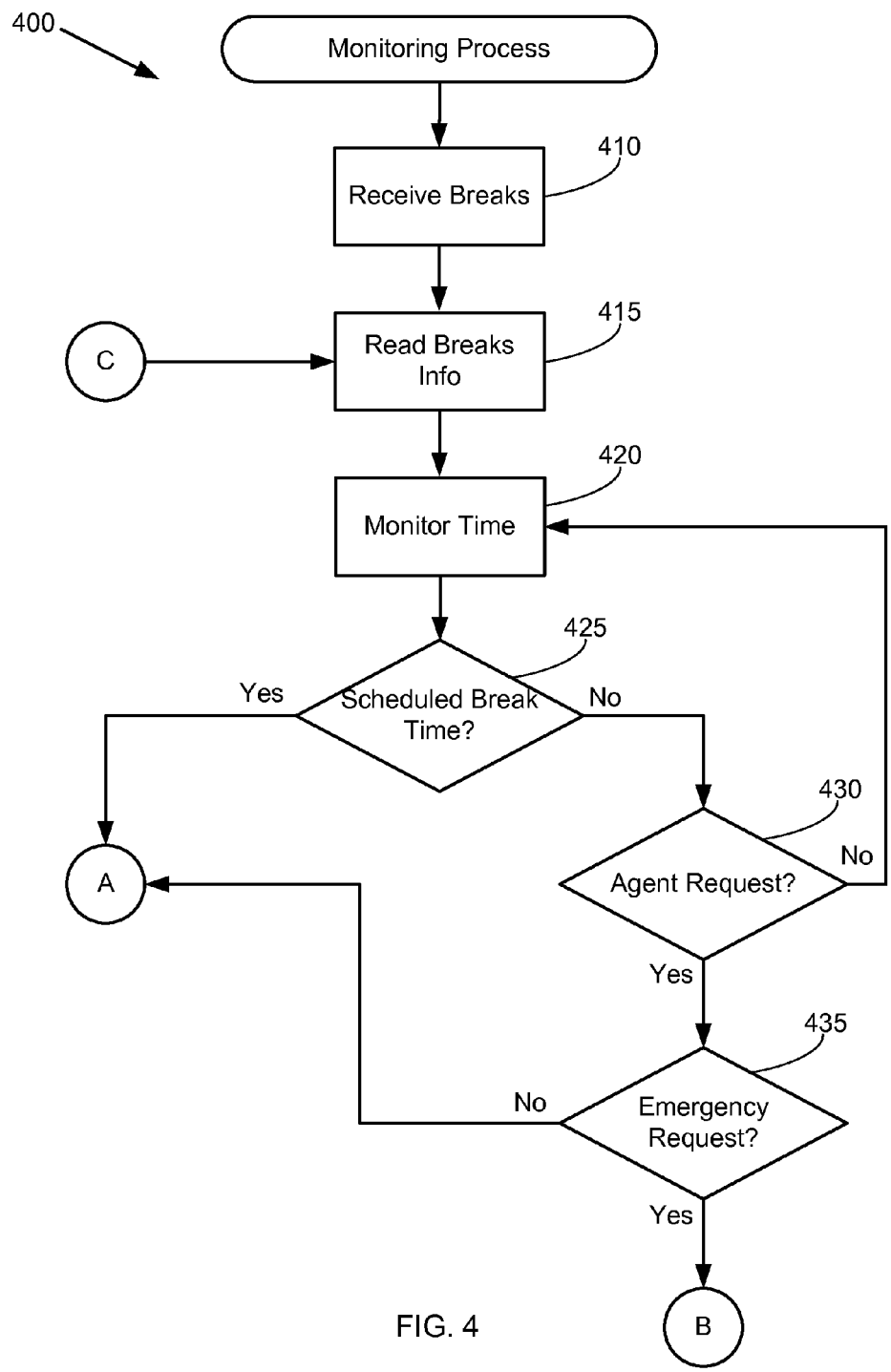
FIG. 4 is a flowchart illustrating a monitoring process for enforcing an agent's breaks in accordance with various embodiments of the present invention.

Turning now to FIG. 4, additional details are provided regarding the process flow for monitoring an agent's breaks to ensure that the agent adheres to his schedule in accordance with various embodiments of the invention. As mentioned, for purposes of simplicity, the description will focus on the example detailed above involving the agent's shift schedule 200 and summary table 300 of breaks provided in FIGS. 2 and 3. At this point, the agent has arrived at the call center and is preparing to start his shift. Accordingly, the agent logs into his workstation so that he can begin his shift. In this instance, a monitoring module residing on his workstation (e.g., on his workstation computer 160a-160c) is invoked. Thus, for the purposes of this example, FIG. 4 provides a flow diagram showing the monitoring module for performing functionality in according to various embodiments of the invention. Thus, the flow diagram shown in FIG. 4 may correspond to operations carried out by a processor in the agent's workstation, as it executes the monitoring module stored in the computing device's volatile and/or nonvolatile memory.

Turning now to FIG. 4, the first operation 410 in the process 400 involves the monitoring module receiving the breaks scheduled for the agent. For instance, typically a call center makes use of a WFM 155 to generate work schedules for its agents. Thus, in these instances, the monitoring module may receive the scheduled breaks for the particular agent associated with the workstation. For example, in one embodiment, the agent logs into the workstation using a user identifier and password. Then the monitoring module queries the call center's WFM 155 by sending the WFM 155 the agent's user identifier and the WFM 155 uses the identifier to provide the agent's scheduled breaks for the shift (and other breaks such as emergency breaks if such breaks are allowed) to the agent's workstation. In addition, the WFM 155 may also provide additional information with respect to the agent's breaks such as a threshold length 335, required lapse time between breaks 340, and/or early break request time limit 345. In other embodiments, the WFM 155 may send the scheduling information to the monitoring module whenever the agent's shift begins.

However, in other embodiments, the agent's breaks information may be stored in some type of storage media and the monitoring module queries the storage media for the breaks information. For instance, in one embodiment, the agent's breaks information may be stored in one or more databases and the monitoring module queries the breaks information from the databases.

Continuing on, the monitoring module reads the breaks information with respect to the first scheduled break for the agent in operation 415. Thus, in the example, the monitoring module reads the information with respect to the break 215 scheduled to occur at 10:45 A.M. for the agent. At this point, the monitoring module monitors the time in operation 420 to detect when the break is to occur. That is, the monitoring module monitors the time to detect when 10:45 A.M. occurs.

Depending on the embodiment, the monitoring module may be configured to provide some type of warning to the agent to let the agent know when a scheduled break is about to occur. For instance, in one embodiment, the monitoring module may provide a popup screen on the agent's workstation letting the agent know that a scheduled break is to occur in a few minutes (e.g., five minutes) so that the agent is aware that he is scheduled to go on break in a few minutes. While in another embodiment, an icon may be provided on the agent's workstation that may signal when a break is about to occur. For example, a traffic light icon may be provided that turns from green to yellow when a break is about to occur and then turns red once the break has occurred. In these instances, the popup screen or icon may allow the agent to wrap up whatever he is working on (e.g., a current call) so that he is able to take his break when the break time arrives.

Figure 5:
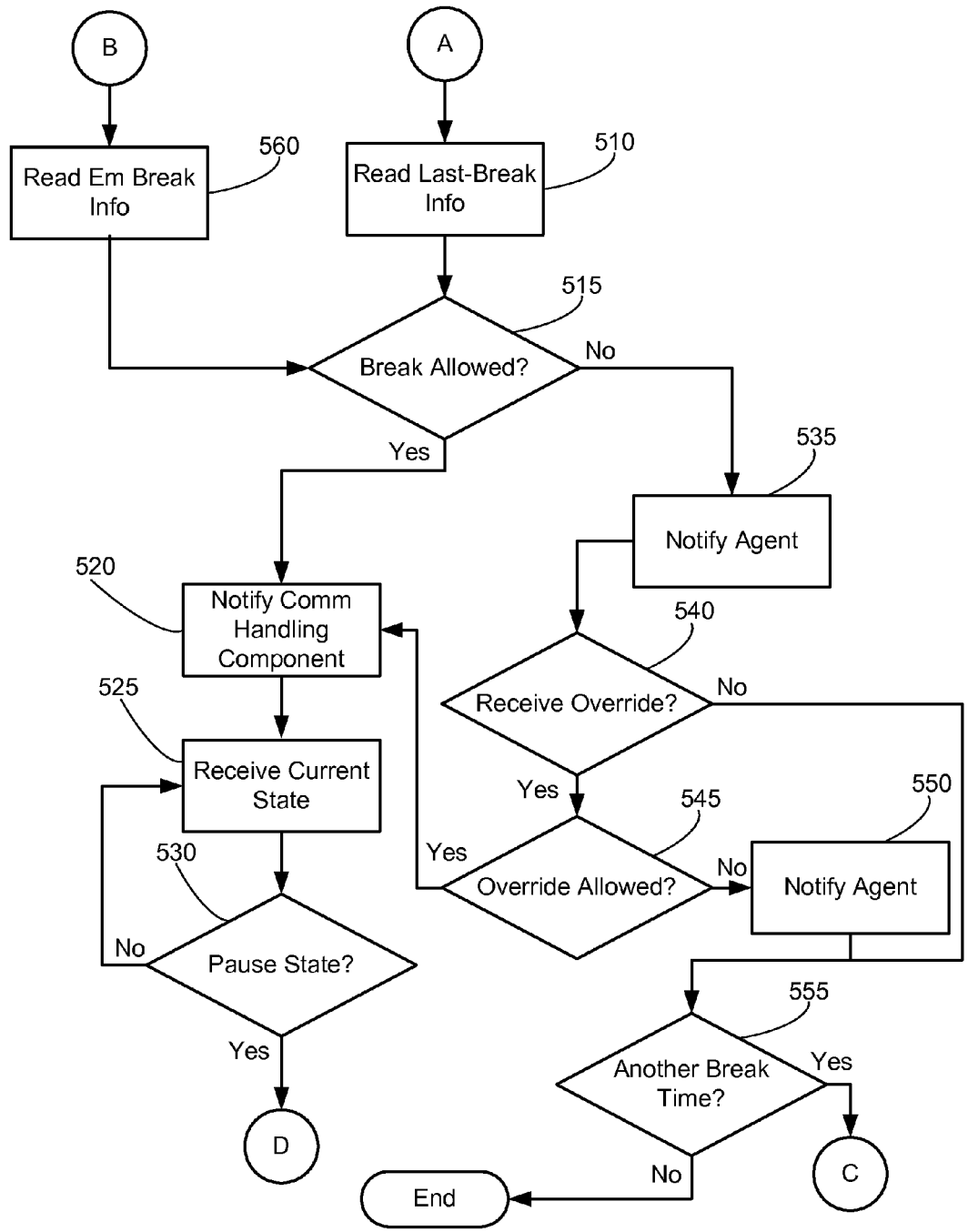
FIG. 5 is a flowchart illustrating a continuation of the monitoring process for enforcing the agent's breaks in accordance with various embodiments of the present invention.

Continuing on, the monitoring module determines whether the current time matches a time for a scheduled break in operation 425. That is, the monitoring module determines whether the current time matches with a break that has been scheduled for the agent. Thus, in the example, the monitoring module determines whether the current time of 10:45 A.M. matches with the start time for a scheduled break. In this instance, the current time does match with the start time for a scheduled break so the monitoring module follows the flow shown for A in FIG. 4. Turning now to FIG. 5, the monitoring module continues the process 400 by reading the information for the last break taken by the agent in operation 510. However, in this instance, since this is the first scheduled break 215 of the shift for the agent, there is no last-break information for the monitoring module to read.

Next, the monitoring module determines whether the break is allowed in operation 515. In this particular operation 515, the monitoring module ensures that the break is allowed to occur so that the agent's schedule is adhered to. For instance, the monitoring module may ensure that the minimal amount of time between breaks (e.g., the required lapse time between breaks 340) has occurred so that the agent is not taking breaks too closely together. In addition, the monitoring module may ensure that the current time is within the value set for the early break request time limit so that the agent is not taking a break too early with respect to when the break has been scheduled to occur. Returning to the example, since the break 215 is to occur at the time that has been scheduled for the break (e.g., 10:45 A.M.), the monitoring module determines the break is allowed.

Thus, since the break is allowed, the monitoring module notifies the call center's communication handling component to place the agent in a pause state (e.g., an unavailable state) when able so that the agent may take his break in operation 520. Thus, in the example, the monitoring module notifies the communication handling component to place the agent in a pause state so that the agent can take his scheduled break 215 starting at 10:45 A.M. Depending of the circumstances, the call center may have a number of different states defined for an agent. For instance, if the call center strictly handles inbound and outbound telephone calls, the call center may define the various states for an agent as: (1) unavailable—handling an inbound call; (2) unavailable—handling an outbound call; (3) available to handle a call; and (4) paused—unable to take a call. In other instances, the call center may handle other types of communications instead of or in addition to inbound and outbound calls. For example, the call center may also handle communications involving text messages, Web chats, and emails. Thus, the call center may define additional states to identify when an agent is involved in one or more of these other types of communications.

For instance, the call center may handle text messages exchanged between agents and parties external to the call center. For example, a customer may contact the call center via a text message with a question about a particular product. In servicing this customer, the call center may forward the text message to a particular agent and the agent may respond to the customer by sending a text message back to the customer. Again, the customer may respond by sending another text message and a series of text message exchanges may follow between the customer and the agent. Thus, in this instance, a communication may comprise the series of text message exchanges between the agent and the customer and the call center may define an agent's state when involved in one of these series of text message exchanges as unavailable—handling series of text message exchanges.

While in another instance, the call center may handle communications that may not require an agent's immediate attention as opposed to communications that typically require an agent's immediate attention. For instance, the call center may handle emails sent to or received by parties external to the call center. Typically, a sender of an email does not expect an immediate response upon sending the email. Therefore, an agent at a call center may handle an email at more of a leisurely pace than compared to a telephone call or series of text message exchanges in which the agent is activity engaged with a party. Thus, in these instances, the call center may have states defined to recognize when an agent is engaged in handling a communication that may not require the agent's immediate attention. For example, the call center may have a state defined for agents as available—handling email. Therefore, although the agent may be actively handing an email for the call center, the agent may still be available to handle a communication such as a telephone call or series of text message exchanges if needed because the agent can return to handing the email at a later time after tending to the telephone call or series of text message exchanges. Further, the same can be said for a scheduled break. Although the agent is actively handling an email, the agent may still be available to take a scheduled break because the agent can return to handling the email at a later time after the break is over. In addition, the agent may be available to receive an email although the agent is currently taking a scheduled break or is handling another communication. Those of ordinary skill in the art can envision numerous states and/or combinations of states that may be defined for call center agents in light of this disclosure and the types of communications being handled by the call center.

However a call center defines the states for its agents, these states typically identify an agent's current status with respect to the agent's availability to handle communications for the call center. For example, if an agent is currently in a state of unavailable—handling an inbound call, then the agent is currently handling an inbound call for the call center and is unavailable to have another call routed to the agent. Typically, a communication handling component of the call center such as, for example, an ACD 130, CTI server 145, and/or dialer 150, is configured to set an agent's state and to monitor the agent's state as the agent handles communications for the call center and attends to other tasks. For example, in particular instances, the ACD 130 routes an inbound call to the agent and, accordingly, sets the agent's state to unavailable—handling an inbound call. As the agent handles the inbound call, the ACD 130 monitors the agent's state and refrains from routing another inbound call to the agent. Once the agent has completed the call, the ACD 130 detects the agent is no longer handling the call and sets the agent's state to available to handle a call so that the ACD 130 may then route another call to the agent. Thus, in various embodiments, the monitoring module is in communication with such a communication handling component and receives the agent's current state from this component.

Thus, returning to FIG. 5, at this point, the communication handling component is notified to place the agent in a pause state so that the agent may take his break and the component does so accordingly. For instance, when the communication handling component receives the notification from the monitoring module, the agent may be currently handling an inbound call for the call center. Therefore, in this instance, the communication handling component waits until the agent has wrapped up the inbound call and then places the agent in a pause state so that no further communications are routed to the agent. Accordingly, as a result of the monitoring module notifying the communication handling component, the agent is placed in a pause state without intervention by the agent. That is, in these particular embodiments, the agent does not intervene by performing any tasks or steps to place him in a pause state.

Depending on the embodiment, the communication handling component may then send a message to the monitoring module to inform the module that the agent has been placed in a pause state or the monitoring module may instead monitor the agent's state to detect when the agent has been placed in the pause state. Regardless, in operation 525, the monitoring module receives the agent's current state to then determine in operation 530 if the agent has been placed in a pause state by the communication handling component. Once the monitoring module determines the agent is in a pause state in operation 530, the process continues with D shown in FIGS. 5 and 6.

Figure 6:
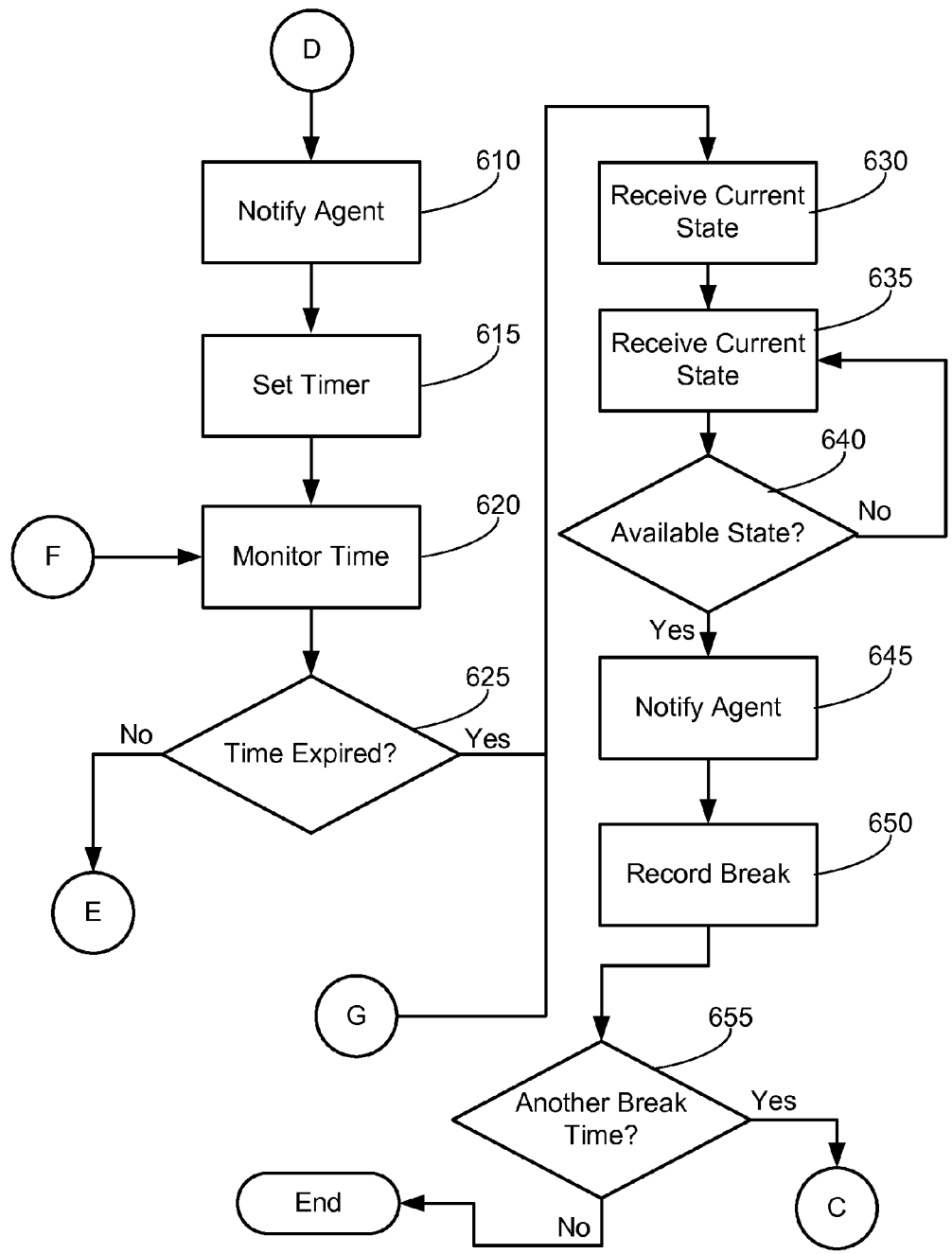
FIG. 6 is a flowchart illustrating a continuation of the monitoring process for enforcing the agent's breaks in accordance with various embodiments of the present invention.

Thus, turning now to FIG. 6, the monitoring module notifies the agent that the agent is now on break in operation 610. Depending on the embodiment, the monitoring module may provide this notification using a number of different mechanisms. For instance, returning to the example involving the traffic light icon displayed on the agent's workstation, the monitoring module may turn the traffic light from yellow to read. In addition, in particular embodiments, the monitoring module may also identify the type of break (e.g., rest break or lunch break) and the length of the break (e.g., fifteen minutes or thirty minutes). Therefore, as a result of this process 400 of automatically placing the agent in a break at 10:45 A.M. (or at some time approximate thereof depending on his availability at 10:45 A.M.), the agent is required to take his scheduled break 215 and, accordingly, the agent's adherence to his schedule is maintained.

At this point, the monitoring module sets a timer to monitor the length of the break in operation 615. Thus, in the example, the monitoring module sets the timer to fifteen minutes. The monitoring module then monitors the time in operation 620 and determines whether the time for the break has expired in operation 625. For instance, in one embodiment, the monitoring module is configured to monitor the time and to check the time every fifteen seconds to determine whether the time for the break is over. In other embodiments, the monitoring module may simply check the current time to determine when fifteen minutes has elapsed.

In particular embodiments, the agent may be provided with some type of mechanism that allows the agent to request to end the break early if desired. That is, the agent may be provided with a mechanism the agent may use to request to be taken out of the pause state. For example, the agent may be on his fifteen-minute break, has tended to all his needs during the break, and may wish to end his break two minutes early. Thus, in these particular embodiments, the agent may be provided with a mechanism (e.g., a button) on his workstation that he may select to request to be taken out of the pause state.

Depending on the embodiment, the mechanism for requesting to be taken out of the pause state may be configured to communicate with different components of the contact center. For instance, in one embodiment, the mechanism may send the request by the agent to the communication handling component. In response, the communication handling component responds by taking the agent out of the pause state and placing the agent back into an available state so that the agent is now available to handle communications for the contact center. However, in another embodiment, the mechanism may instead send the agent's request to the monitoring module.

Figure 7A:
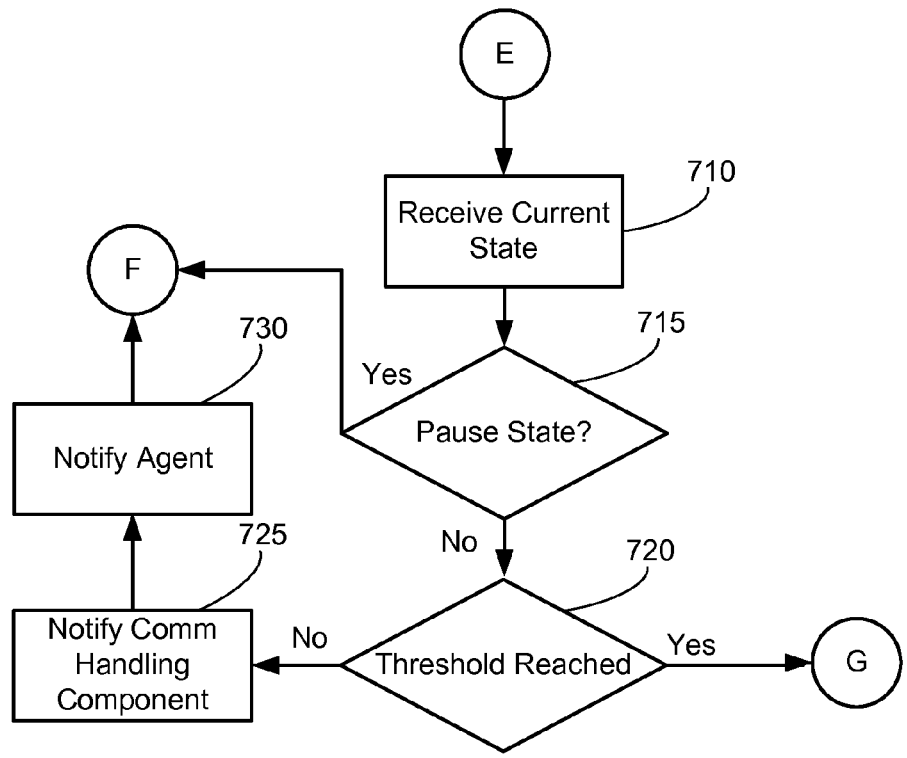
FIGS. 7A-7B are flowcharts illustrating continuations of the monitoring process for enforcing the agent's breaks in accordance with various embodiments of the present invention.
Figure 7B:
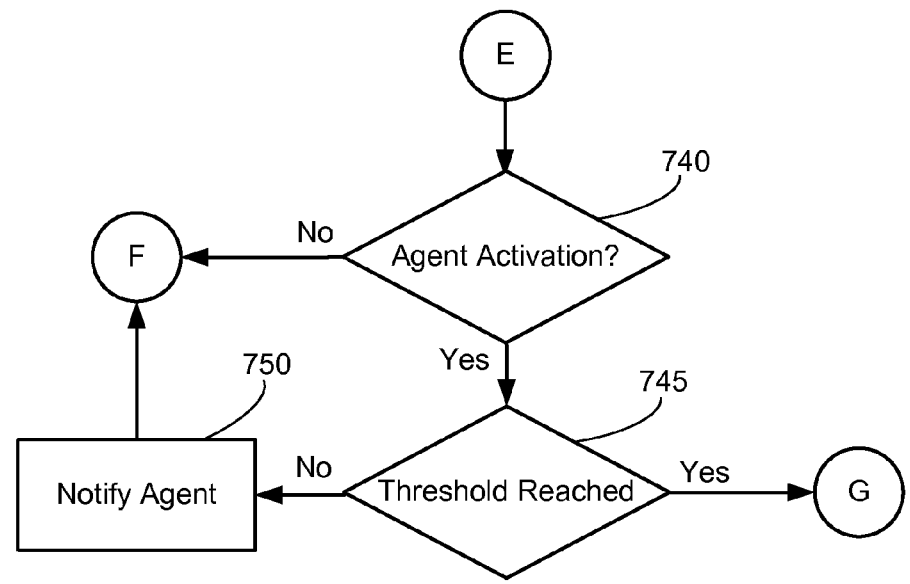

Accordingly, turning now to FIGS. 7A and 7B, these two figures demonstrate embodiments of the process flow with respect to whether the agent's request to be taken out of the pause state is sent to the communication handling component or the monitoring module. Specifically, FIG. 7A provides an embodiment of a process flow in which in the agent's request is sent to the communication handling component. In this instance, the monitoring module receives the agent's current state in operation 710. As previously mentioned, depending on the embodiment, the monitoring module may receive the agent's current state by the communication handling component sending the agent's state to the monitoring module or by the monitoring module monitoring the agent's state to detecting the state accordingly. Regardless, in operation 715, the monitoring module determines whether the agent is still in the pause state.

As you may recall, this portion of the process flow is executed when the timer for the agent's break has not expired. Thus, in these instances, the agent should be currently in a pause state. However, in the example, the agent has requested to end his break two minutes early and has selected the appropriate mechanism to do so. In turn, the communication handling component has received the agent's request and changed the agent's state from paused to available. Therefore, in the example, the monitoring module determines the agent is not in the pause state.

Thus, in operation 720, the monitoring module determines whether the agent has taken an adequate break with respect to the scheduled length of the break. That is, in operation 720, the monitoring module may determine whether a threshold has been reached with respect to the amount of time the agent has been on break with respect to the amount of time scheduled for the break. As you may recall, in various embodiments, the agent's breaks information may include one or more values for a threshold length 335 with respect to a minimal amount of time an agent is required to take for a break with respect to the scheduled length of the break. As mentioned, such threshold values may be instituted by the call center to ensure that agents are taking adequate breaks during their shifts so that agents' efficiencies are not affected negatively by agents taking too short of breaks. Therefore, returning to the example, if the agent requests to end the break 215 two minutes early and the threshold is set to eighty percent then the monitoring module determines that the break may end because the minimal amount of time the agent must take for the fifteen-minute break 215 is twelve minutes (eighty percent of fifteen minutes).

However, had the agent requested to end his break after only taking ten minutes of the break, then the monitoring module would have determine the threshold for the break had not been reached. Accordingly, in operation 725, the monitoring module would have then notified the communication handling component to place the agent back into a pause state and notified the agent in operation 730 that he has been placed back into a pause state. Furthermore, the monitoring module may notify the agent that he has not taken an appropriately long enough break and/or informed him on the minimal amount of break time he is required to take. At this point, the monitoring module would return to monitoring the timer in operation 620 in FIG. 6.

Turning now to FIG. 7B, if instead the monitoring module is configured to receive the agent's request to be taken out of the pause state, then in operation 740, the monitoring module would determine whether such a request has been received from the agent. If the monitoring module determines that such a request has been received, then in operation 745, the monitoring module determines whether the threshold has been reached with respect to the amount of time the agent has been on break with respect to the amount of time scheduled for the break. Thus, this particular operation is carried out in a similar manner as the same operation for the process flow shown in FIG. 7A. Accordingly, if the threshold has not been met, the monitoring module informs the agent of such in operation 750. At this point, the monitoring module would return to monitoring the timer in operation 620 of FIG. 6. However, if the monitoring module determines that the threshold has been met, then the monitoring module continues with the remainder of the process flow shown in FIG. 6.

Accordingly, once the timer has expired for the break or the agent has appropriately requested to end the break early, the monitoring module notifies the communication handling component in operation 630 to place the agent in the available state. In particular embodiments, the monitoring module may first verify that the agent is available and ready at his workstation before sending the notification to the communication handling component to place the agent in the available state. For instance, in one embodiment, the monitoring module may provide a popup screen on the agent's workstation requesting the agent to acknowledge that he is at his workstation and is ready to be made available. Such verification may ensure the agent is not inadvertently placed in an available state in instances when the agent is not present at his workstation.

At this point, the monitoring module receives the agent's current state in operation 635 to detect when the agent has been placed in an available state. Again, depending on the embodiment, the monitoring module may monitor the agent's state to detect when the agent's state has changed to available or receive a message from the communication handling component informing the module that the agent's state has changed to available. At this point, once the monitoring module determines the agent is in an available state in operation 640, the module notifies the agent of his current state in operation 645. The monitoring module then records the break in operation 650. Depending on the embodiment, the monitoring module may record the information on the break in some type of permanent or non-permanent storage.

Finally, the monitoring module determines whether the agent is to receive another break in operation 655. For instance, returning to the example, the agent is also scheduled for a lunch break 225 at 12:30 P.M. and an afternoon break 235 at 2:45 P.M. (The agent also has an emergency break 330 the agent can take if needed.) Thus, in operation 655, the monitoring module continues to C in the process 400 and, returning to FIG. 4, the process 400 repeats for the next break (e.g., the agent's lunch break 225 scheduled at 12:30 P.M.). Specifically, the monitoring module reads the information for the lunch break in operation 415.

As the agent's lunch break 225 approaches, the agent decides that he would like to take his lunch early at 12:15 P.M. The monitoring module knows the current time in operation 420 and determines that the lunch break start time has not yet occurred in operation 425. The agent selects a button on his workstation requesting to immediately go on break and accordingly, the monitoring module determines the agent has requested to go on break in operation 430. Depending on the embodiment, the monitoring module may make this determination by receiving the agent's request to go on a break early or by determining that the agent's state has changed to a state indicating the agent is now on a break. For instance, in one embodiment, the agent may request to be placed in a pause state and this request is received by the communication handling component. Accordingly, the communication handling component places the agent in a pause state. Thus, for this embodiment, the monitoring module may determine that the agent has requested to take a break because the agent has been placed in a pause state.

In response, in particular embodiments, the workstation may request the agent to identify whether he is requesting to go on an emergency break or on his next scheduled break in operation 435. In response, the agent indicates that he would like to go on his next scheduled break, which is his lunch break 225 scheduled for 12:30 P.M. Since the agent has requested to go on his next scheduled break (his lunch break 225) fifteen minutes early, the monitoring module determines the agent's request is with respect to his next scheduled break and continues the process 400 as previously described with respect to a scheduled break. Thus, turning now to FIG. 5, the monitoring module reads the last-break information in operation 510. In this instance, the last-break information is on the scheduled break 215 the agent took at 10:45 A.M.

Therefore, the monitoring module determines whether the agent may immediately go on his next scheduled break in operation 515. Firstly, in this embodiment, the monitoring module determines whether the required lapse time between breaks 340 will be met. In this instance, the value for the required lapse time between breaks 340 is sixty minutes. From the last-break information, the monitoring module determines that the previous break ended at 10:58 A.M. and was scheduled to end at 11:00 A.M. Depending on the embodiment, the monitoring module may use the actual ending time and/or scheduled ending time of the previous break. Therefore, the monitoring module determines that the required lapse time between breaks 340 will be met if the agent is allowed to go on his lunch break 225 at 12:15 P.M. Secondly, the monitoring module determines whether the early break request time limit 345 will be met if the agent takes his lunch break 225 at 12:15 P.M. In this instance, the monitoring module determines that this condition will not be met because the value for the early break request time limit 345 is five minutes. Thus, since his lunch break 225 is scheduled to begin at 12:30 P.M., the earliest the agent is allowed to go on his lunch break 225 is 12:25 P.M.

Accordingly, the monitoring module notifies the agent in operation 535 that he is unable to go on his lunch break 225 at this time. Depending on the embodiment, the monitoring module may be configured to provide additional information long with this notification such as, for example, the earliest time the agent may request to go on his lunch break 225.

Further, depending on the embodiment, the monitoring module may notify the communication handling component (not shown) to remove the agent from the pause state. As a result of these various checks performed by the monitoring module, the agent is required to adhere to his shift schedule and to take his lunch break 225 at the appropriate time so that the call center can ensure that the required number of agents are available to handle the predicted call volume. Had the agent been allowed to go on his lunch break 225 at 12:15 P.M., this may have resulted in the call center having a shortage of available agents between 12:15 P.M. and 12:30 P.M. to handle the volume of calls received by the call center during this time.

It should be noted that in various embodiments, the values for threshold length 335, the required lapse time between breaks 340, and/or early break request time limit 345 may be changed (may be dynamic) based on one or more real-time parameters observed by the call center. For instance, in particular embodiments, a call center component such as, for example, the ACD 130, CTI server 145, or the WFM 155, may control (e.g., revise) one or more of these values based on parameters such as, for example, the current volume of communications the call center is experiencing and/or the number of currently available agents for the call center. Thus, in this example, the call center component may measure the volume of calls the call center is currently experiencing and may determine that the volume of calls is lower than expected (predicted) for the particular time period. As a result, the call center component may revise the value for the early break request time limit 345 to twenty minutes. Accordingly, the agent's request to take his lunch break 225 fifteen minutes early may now be fulfilled.

Further, in particular embodiments, the monitoring module may be configured to allow for a party to override a refusal of a break. For instance, in the example above, the monitoring module's refusal to allow the agent to go on his lunch break 225 fifteen minutes early may be subject to override. Thus, in these particular embodiments, the agent may request to override the refusal to go on break and the monitoring module receives this request in operation 540. At this point, depending on the embodiment, the monitoring module may handle the request in different ways. For instance, in one embodiment, the request is forwarded to a supervisor who may then indicate that the override request is granted. While in another embodiment, the monitoring module may be configured to use one or more override rules to determine whether the request should be granted. Regardless, in operation 545, the monitoring module determines whether the override is allowed. If so, then the monitoring module follows the same process as previously described with respect to implementing a break. If not, then the monitoring module informs the agent of such in operation 550.

Finally, in the process 400, once the monitoring module notifies the agent that his request to take his lunch break 225 fifteen minutes early cannot be fulfilled (and his override request has been denied, if applicable), the monitoring module determines whether another break is to be monitored for the agent in operation 555. In this instance, the agent is to receive more scheduled breaks, so the monitoring module returns to operation 415 of FIG. 4 to read the information for the next break (which, in this instance, is still the agent's lunch break 225).

Lastly, in instances in which the agent requests to take an emergency break, the monitoring module determines that such a break has been requested in operation 435. For instance, had the agent indicated that he wanted to take an emergency break at 12:15 P.M. instead of starting his lunch break early the monitoring module would have followed the process 400 to B in FIG. 4. Thus, turning now to FIG. 5, the monitoring module would then read the information for the emergency break in operation 560. In this instance, the information would indicate that the agent is entitled to one ten minute emergency break. At this point, the monitoring module would determine if the agent was allowed to take his emergency break in operation 515.

Depending on the embodiment, one or more conditions may be place on allowing the agent to take his emergency break. For instance, the monitoring module may be required to apply the same requirements with respect to taking the emergency break as are applied to taking a scheduled break such as, for example, the required lapse time between breaks 340. In addition, in particular embodiments, the monitoring module may be configured to determine in the operation 515 whether the emergency break is proximate to a scheduled break and whether the requested break may instead qualify as and/or take the place of the scheduled break. However, in other embodiments, the emergency break may be configured as a break that an agent is allowed to request to take at any time regardless of the agent's scheduled breaks. Thus, depending on the circumstances, emergency breaks may be provided to an agent on a per shift basis (e.g., one per shift), a per schedule basis (e.g., two per weekly schedule), a per monthly basis (e.g., five per month), etc.

Component Configurations

As shown above, the monitoring module may reside on an agent's workstation in order to monitor the agent's break. However, in other embodiments, the monitoring module may reside on other components within the call center architecture 100. Accordingly, FIGS. 8A-8D provide examples of different component configurations that may be utilized in practicing various embodiments of the invention. It should be noted that these configurations serve only as a few examples of different configurations and other configurations are contemplated.

Figure 8A:
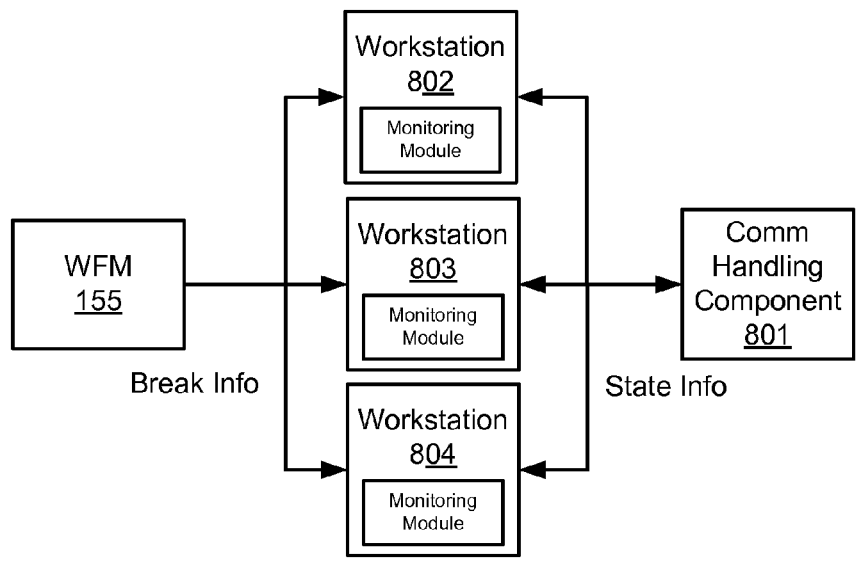
FIGS. 8A-8D provide different component configurations in accordance with various embodiments of the present invention.

For instance, FIG. 8A provides a configuration in which the monitoring module resides on each agent's workstation 802, 803, 804. In this configuration, the monitoring module residing on a particular workstation 802, 803, 804 receives the break information for the particular agent using the workstation 802, 803, 804 from the WFM 155 and uses this information to monitor and control the particular agent's breaks. Accordingly, when a break is to occur for the particular agent, the monitoring module communications with the communication handling component 801 (e.g., an ACD 130 or dial 150) to exchange state information to place the particular agent in a state of pause so that the agent may take his break. In similar fashion, once the break is to end, the monitoring module again communications with the communication handling component 801 to exchange state information to with respect to placing the agent in a state of available so that the agent may resume handling calls for the call center. Thus, for this particular configuration, the monitoring module is only responsible for monitoring and controlling the breaks for the agent using the particular workstation 802, 803, 804 on which the monitoring module resides. It should be noted that in alternative embodiments, the workstations 802, 803, 804 may not necessarily receive break information directly from the WFM 155. For instance, in one embodiment, this information may be channeled through the communication handling component 801 to the workstations 802, 803, 804.

Figure 8B:
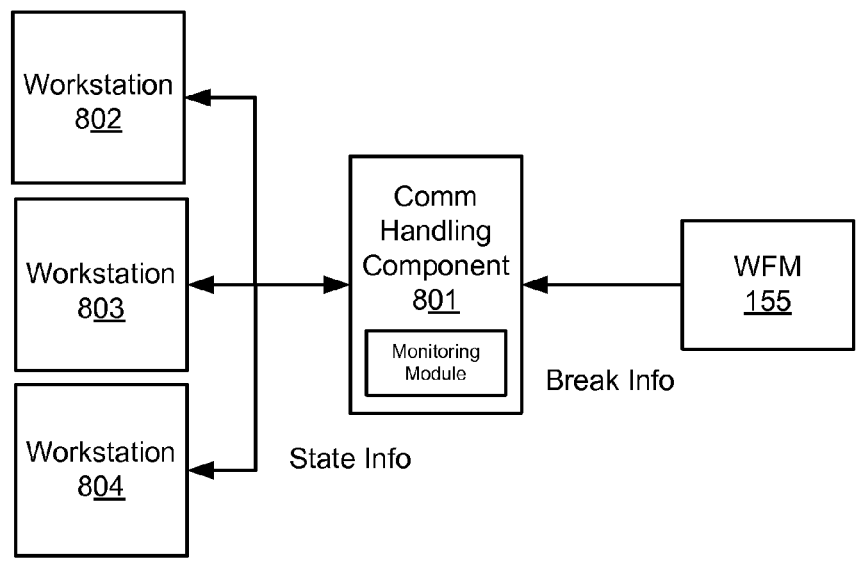

FIG. 8B provides a configuration in which the monitoring module resides on the communication handling component 801. In this instance, the monitoring module is responsible for monitoring and controlling the breaks for various agents who are currently logged into the different workstations 802, 803, 804. For example, in one embodiment, an instance of the monitoring module is invoked on the communication handling component 801 for each agent that the monitoring module is responsible for monitoring.

For this configuration, the monitoring module residing on the communication handling component 801 receives break information for the various agents logged into the workstations 802, 803, 804 from the WFM 155. In turn, the module then communications with the communication handling component 801 to communication state information with respect to the various agents using the workstations 802, 803, 804. Thus, when a particular agent is scheduled to take a break, the module communicates such to the communication handling component 801 so that the component 801 can place the agent in a pause state. Depending on the embodiment, the module may also communication with the appropriate workstation 802, 803, 804 to inform the agent to take his break. Likewise, once the break is over, the monitoring module exchanges state information with the communication handling component 801 to place the appropriate agent is a state of available. Again, depending on the embodiment, the monitoring module may exchange state information with the individual workstation 802, 803, 804 to inform the agent his break is over.

Figure 8C:
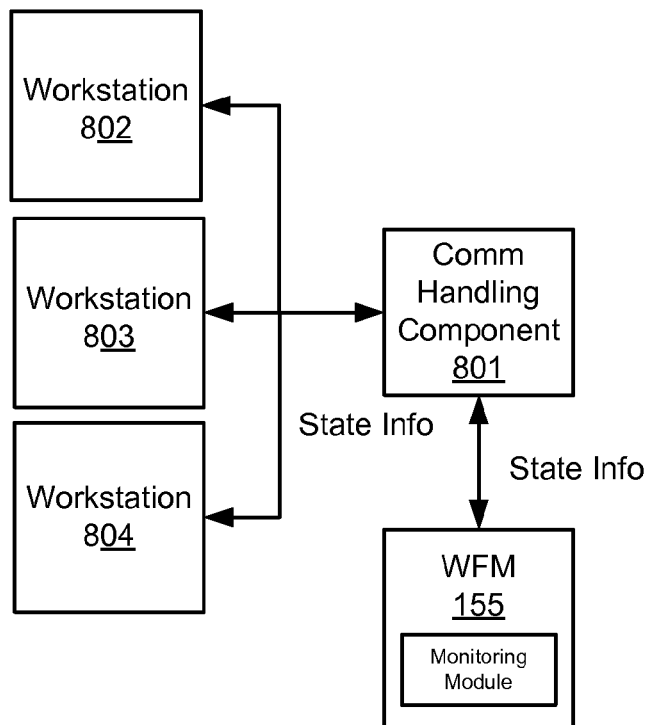

Next, FIG. 8C provides a configuration in which the monitoring module resides on the WFM 155 and monitors and controls the breaks for various agents logged into the workstations 802, 803, 804 by communicating with the communication handling component 801. For this configuration, the monitoring module monitors the breaks for various agents logged into the workstations 802, 803, 804 and when a break is to occur for a particular agent, the monitoring module communicates with the communication handling component 801 to exchange state information to place the agent in a state of pause. Accordingly, the communication handling component 801 may then communicate with the appropriate workstation 802, 803, 804 so that the agent is aware that he has been placed on break. Likewise, when the agent's break is to end, the monitoring module again exchanges state information with the communication handling component 801 to place the agent in a state of available so that he may resume handling calls for the call center. In turn, the communication handling component 801 may exchange state information with the appropriate workstation 802, 803, 804 to inform the agent that he is now in a state of available.

Figure 8D:
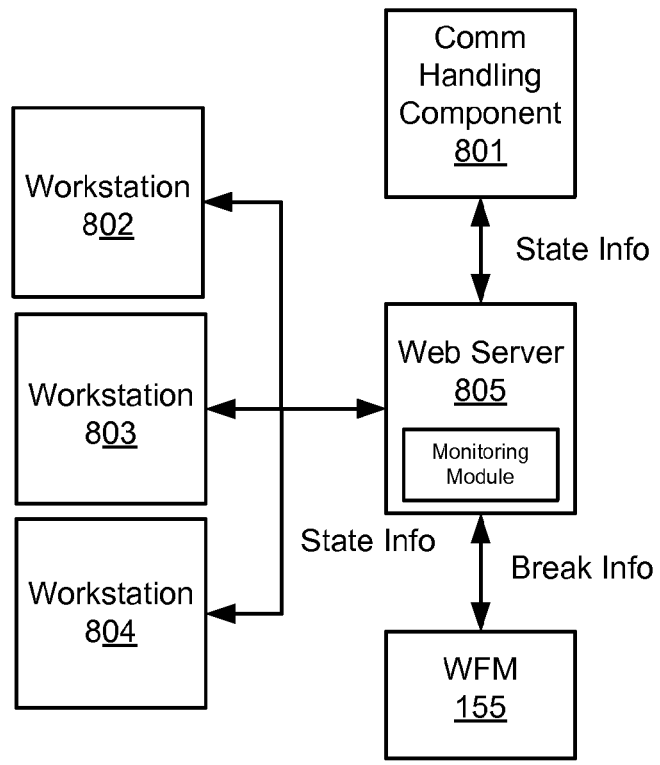

Finally, FIG. 8D provides a configuration in which a web server 805 is used by the call center to provide workstation functionality to agents. That is, for this configuration, an agent is provided workstation functionality through one or more Web pages delivered to a browser residing on his workstation 802, 803, 804. For example, in particular instances, the workstations 802, 803, 804 comprise computers residing in agents' homes and the agents are provided Web pages on their computers' browsers so that they can handle calls for the call center while at home. Thus, for this configuration, the monitoring module resides on the web server 805 to monitor and control the various breaks for the agents currently being delivered Web pages.

Similar to the monitoring module residing on the communication handling component 801 or WFM 155, in particular embodiments, an instance of the monitoring module may be invoked on the web server 805 for each agent that the monitoring module is responsible for monitoring. Thus, for this configuration, the monitoring module receives break information for the individual agents from the WFM 155 and when a break is to occur for a particular agent, the monitoring module communicates with the communication handling component 801 to exchange state information to place the particular agent in a state of pause. Accordingly, the web server 805 then communicates with the appropriate workstation 802, 803, 804 to inform the agent that he is now on break. Likewise, when the agent's break is over, the monitoring module communicates with the communication handling component 801 to place the agent in a state of available and accordingly, the web server 805 communications with the appropriate workstation 802, 803, 804 to inform the agent he is now in a state of available so that he may resume handling calls for the call center. It should be noted that for particular embodiments of this configuration, the web server 805 (monitoring module) may receive information through various channels. For example, in one embodiment, the web server 805 may instead receive the break information for the agents from the communication handling component 801 as opposed to directly from the WFM 155. That is, in this embodiment, the break information may be channeled from the WFM 155 through the communication handling component 801 to the web server 805.

Exemplary Processing Device Architecture

Figure 9:
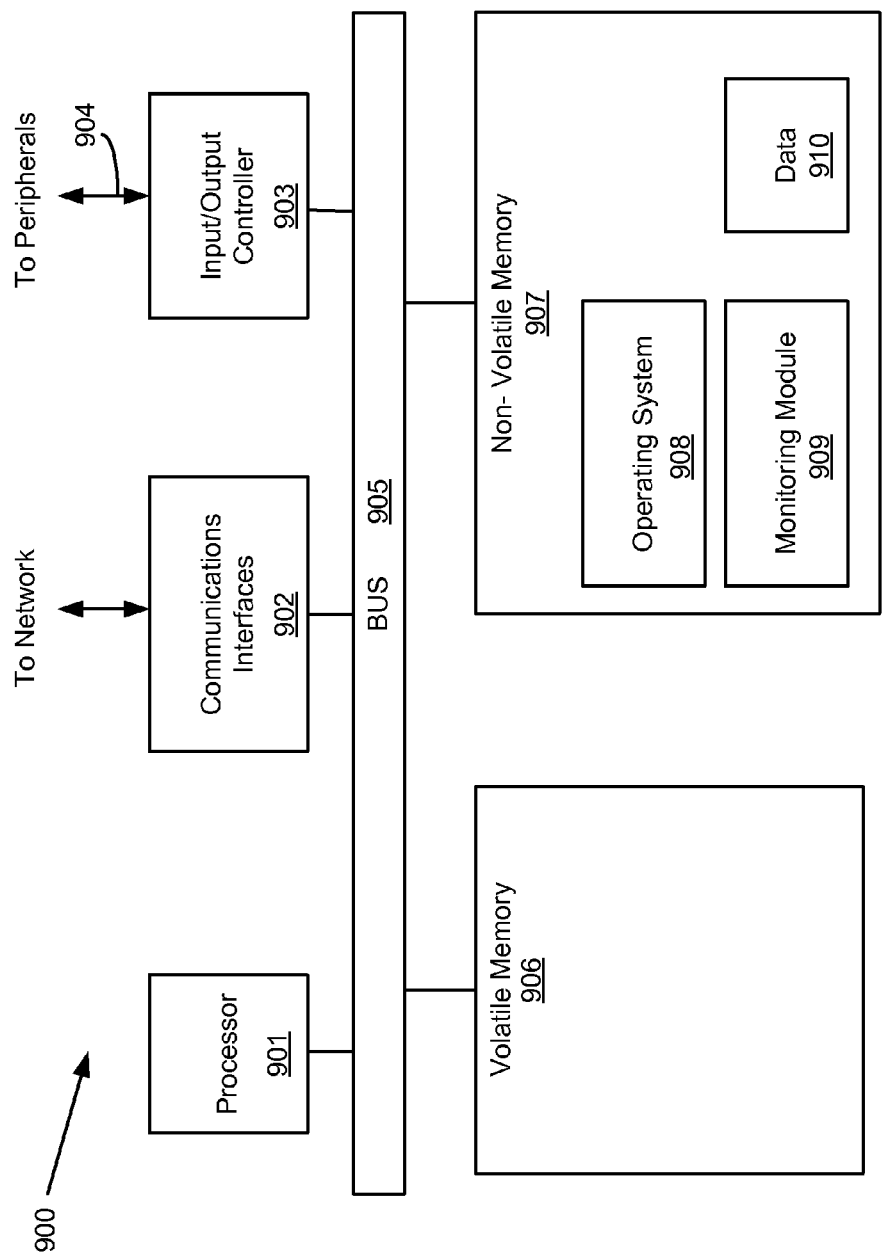
FIG. 9 is an exemplary schematic diagram of a system used in one embodiment of the call center architecture to practice the technologies disclosed herein.

As discussed in conjunction with FIG. 1, the call center architecture 100 may comprise various components that comprise a processing system. FIG. 9 is an exemplary schematic diagram of a processing system 900 that may be used in an embodiment of the call center architecture 100 to practice the technologies disclosed herein such as, for example, the ACD 130, IVR 135, CRM server 140, CTI server 145, dialer 150, WFM 155, agents' computing device 160a-160c, a web server, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 9, the processing system 900 may include one or more processors 701 that may communicate with other elements within the processing system 900 via a bus 905. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, etc.

The processor 901 may be configured to execute instructions stored in volatile memory 906, non-volatile memory 907, or other forms of computer-readable storage media accessible to the processor 901. The volatile memory 906 may comprise various types of memory technologies, including, but not limited to: random access memory ("RAM"), dynamic random access memory ("DRAM"), static random access memory ("SRAM"), and other forms well known to those skilled in the art. The non-volatile memory 907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 907 may store one or more computer program modules, such as, for example, the monitoring module 909 and/or operating system code 908 containing instructions for performing the process and/or functions associated with the technologies disclosed herein. In addition, the monitoring module 909 may also access, generate, or store schedule related and other data 910 (such as the breaks information for an agent) in the non-volatile memory 907, as well as in the volatile memory 906. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901. These may form a part of, or may interact with, the monitoring module 909.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for allowing a contact center agent to take a scheduled break from handling one or more communications for a contact center, the method comprising the steps of:
   upon detecting a request from the contact center agent to begin the scheduled break prior to a scheduled start time for the scheduled break:
      determining by at least one computer processor whether a current time is within an early break request time limit with respect to the scheduled start time; and
      in response to the current time being within the early break request time limit with respect to the scheduled start time:
         setting a current state for the contact center agent by the at least one computer processor to indicate the contact center agent is unavailable to handle the one or more communications for the contact center so that none of the one or more communications are routed to the contact center agent.

2. The method of claim 1 further comprising the step of, after a period of time, setting the current state for the contact center agent by the at least one computer processor to indicate the contact center agent is available to handle the one or more communications for the contact center so that at least one of the one or more communications is routed to the contact center agent.

3. The method of claim 2, wherein the period of time comprises an amount of time between the scheduled start time for the scheduled break and a scheduled end time for the scheduled break.

4. The method of claim 2, wherein the period of time comprises an amount of time between the scheduled start time for the scheduled break and a time at which the contact center agent requests to have the current state for the contact center agent set to indicate the contact center agent is available to handle the one or more communications for the contact center, and the amount of time comprises at least a threshold amount of time, the threshold amount of time being less than a total amount of time between the scheduled start time for the scheduled break and a scheduled end time for the scheduled break.

5. The method of claim 1, wherein the at least one computer processor resides on a workstation the contact center agent is currently using.

6. The method of claim 1, wherein each of the one or more communications for the contact center comprise a telephone call or a series of text message exchanges between one of a plurality of contact center agents and a party external to the contact center.

7. The method of claim 1, wherein the early break request time limit is dependent on at least one of a volume of communications the contact center is currently experiencing and a number of currently available contact center agents.

8. A non-transitory computer-readable storage medium comprising computer-executable instructions for allowing a contact center agent to take a scheduled break from handling one or more communications for a contact center, the computer-executable instructions configured to cause at least one computer processor to:
   upon detecting a request from the contact center agent to begin the scheduled break prior to a scheduled start time for the scheduled break:
      determine whether a current time is within an early break request time limit with respect to the scheduled start time; and
      in response to the current time being within the early break request time limit with respect to the scheduled start time:
         set a current state for the contact center agent to indicate the contact center agent is unavailable to handle the one or more communications for the contact center so that none of the one or more communications are routed to the contact center agent.

9. The non-transitory computer-readable storage medium of claim 8, wherein the computer-executable instructions are further configured to cause the at least one computer processor to, after a period of time, set the current state for the contact center agent to indicate the contact center agent is available to handle the one or more communications for the contact center so that at least one of the one or more communications is routed to the contact center agent.

10. The non-transitory computer-readable storage medium of claim 9, wherein the period of time comprises an amount of time between the scheduled start time for the scheduled break and a scheduled end time for the scheduled break.

11. The non-transitory computer-readable storage medium of claim 9, wherein the period of time comprises an amount of time between the scheduled start time for the scheduled break and a time at which the contact center agent requests to have the current state for the contact center agent set to indicate the contact center agent is available to handle the one or more communications for the contact center, and the amount of time comprises at least a threshold amount of time, the threshold amount of time being less than a total amount of time between the scheduled start time for the scheduled break and a scheduled end time for the scheduled break.

12. The non-transitory computer-readable storage medium of claim 8, wherein the at least one computer processor resides a workstation the contact center agent is currently using.

13. The non-transitory computer-readable storage medium of claim 8, wherein each of the one or more communications for the contact center comprise a telephone call or a series of text message exchanges between one of a plurality of contact center agents and a party external to the contact center.

14. The non-transitory computer-readable storage medium of claim 8, wherein the early break request time limit is dependent on at least one of a volume of communications the contact center is currently experiencing and a number of currently available contact center agents.

15. A system for allowing a contact center agent to take a scheduled break from handling one or more communications for a contact center, the system comprising:
   at least one computer processor; and
   a communication handling component, wherein:
      the at least one computer processor is configured to:
         upon detecting a request from the contact center agent to begin the scheduled break prior to a scheduled start time for the scheduled break:
            determine whether a current time is within an early break request time limit with respect to the scheduled start time; and
            in response to the current time being within the early break request time limit with respect to the scheduled start time:
               have the communication handling component set a current state for the contact center agent to indicate the contact center agent is unavailable to handle the one or more communications for the contact center so that none of the one or more communications are routed to the contact center agent.

16. The system of claim 15, wherein the at least one computer processor is configured to, after a period of time, have the communication handling component set the current state for the contact center agent to indicate the contact center agent is available to handle the one or more communications for the contact center so that at least one of the one or more communications is routed to the contact center agent.

17. The system of claim 16, wherein the communication handling component comprises an automatic call distributor.

18. The system of claim 16, wherein the period of time comprises an amount of time between the scheduled start time for the scheduled break and a scheduled end time for the scheduled break.

19. The system of claim 15, wherein the at least one computer processor resides on a workstation being used by the contact center agent.

20. The system of claim 15, wherein the period of time comprises an amount of time between the scheduled start time for the scheduled break and a time at which the contact center agent requests to have the current state for the contact center agent set to indicate the contact center agent is available to handle the one or more communications for the contact center, and the amount of time comprises at least a threshold amount of time, the threshold amount of time being less than a total amount of time between the scheduled start time for the scheduled break and a scheduled end time for the scheduled break.

21. The system of claim 15, wherein each of the one or more communications for the contact center comprise a telephone call or a series of text message exchanges between one of a plurality of contact center agents and a party external to the contact center.

22. The system of claim 15, wherein the early break request time limit is dependent on at least one of a volume of communications the contact center is currently experiencing and a number of currently available contact center agents.

\* \* \* \* \*